(12) United States Patent
Hucker

(10) Patent No.: US 10,626,655 B2
(45) Date of Patent: Apr. 21, 2020

(54) BRAKING MECHANISM

(71) Applicant: GEZE GmbH, Leonberg (DE)

(72) Inventor: Matthias Hucker, Marxzell (DE)

(73) Assignee: Geze GmbH, Leonberg (DE)

( * ) Notice: Subject to any disclaimer, the term of this patent is extended or adjusted under 35 U.S.C. 154(b) by 75 days.

(21) Appl. No.: 15/890,128

(22) Filed: Feb. 6, 2018

(65) Prior Publication Data

US 2018/0313129 A1 Nov. 1, 2018

(30) Foreign Application Priority Data

Feb. 8, 2017 (DE) .................. 10 2017 201 950

(51) Int. Cl.
*E05F 5/02* (2006.01)
*E05F 15/603* (2015.01)
(Continued)

(52) U.S. Cl.
CPC .............. *E05F 5/02* (2013.01); *E05F 15/40* (2015.01); *E05F 15/603* (2015.01); *H02P 3/12* (2013.01); *H02P 3/22* (2013.01); *H02P 29/0241* (2016.02); *E05F 15/72* (2015.01); *E05Y 2201/21* (2013.01); *E05Y 2201/408* (2013.01); *E05Y 2201/41* (2013.01); *E05Y 2201/434* (2013.01); *E05Y 2400/302* (2013.01); *E05Y 2400/36* (2013.01); *E05Y 2400/40* (2013.01); *E05Y 2900/132* (2013.01)

(58) Field of Classification Search
CPC ......... E05F 15/603; E05F 15/608; E05F 5/00; E05F 5/02; H02P 29/02; H02P 3/22; H02P 6/24
See application file for complete search history.

(56) References Cited

U.S. PATENT DOCUMENTS 5,070,290 A * 12/1991 Iwasa .................. B66B 5/02
  187/288
6,175,204 B1 * 1/2001 Calamatas ............ H02P 7/04
  318/375

(Continued)

FOREIGN PATENT DOCUMENTS

DE   202009000907 U1   6/2010
DE   102009042456 A1   9/2011
DE   102015200284 B3   10/2015

*Primary Examiner* — Thai T Dinh
(74) *Attorney, Agent, or Firm* — Steven M. Shape; Dennemeyer & Associates, LLC

(57) ABSTRACT

A braking device for a movable door leaf comprises an electric motor operated as a generator, whose shaft is rotatable through a movement of the door leaf and at whose terminals a movement-dependent motor voltage is created and a brake circuit to which the motor voltage is applied or could be applied and which can be short-circuited via the motor terminals to dampen movement of the door leaf. In addition, the braking device comprises an emergency brake circuit to which the motor voltage is applied or applicable and via which the motor terminals can be short-circuited to dampen a movement of the door leaf. In doing so, means are provided which are designed to detect the presence of a malfunction of the brake circuit and to short-circuit the motor terminals via the emergency brake circuit when the presence of a malfunction of the brake circuit is detected.

18 Claims, 1 Drawing Sheet

(51) Int. Cl.
*H02P 3/12* (2006.01)
*H02P 29/024* (2016.01)
*E05F 15/40* (2015.01)
*H02P 3/22* (2006.01)
*E05F 15/72* (2015.01)

(56) References Cited

U.S. PATENT DOCUMENTS

| | | | | |
|---|---|---|---|---|
| 6,194,856 | B1 * | 2/2001 | Kobayashi | H02M 7/003 318/432 |
| 7,479,756 | B2 * | 1/2009 | Kasunich | H02H 7/1216 318/731 |
| 7,696,706 | B2 * | 4/2010 | Chiu | H02P 6/24 318/375 |
| 8,044,617 | B2 * | 10/2011 | Lee | B60L 7/003 318/293 |
| 8,234,817 | B2 * | 8/2012 | Neundorf | E05B 81/20 49/28 |
| 8,330,406 | B2 * | 12/2012 | Noie | H02P 7/04 318/400.01 |
| 10,090,776 | B2 * | 10/2018 | Basic | H02M 7/48 |
| 2011/0185941 | A1 * | 8/2011 | Gonzalez Fernandez | B61D 19/026 105/341 |

* cited by examiner

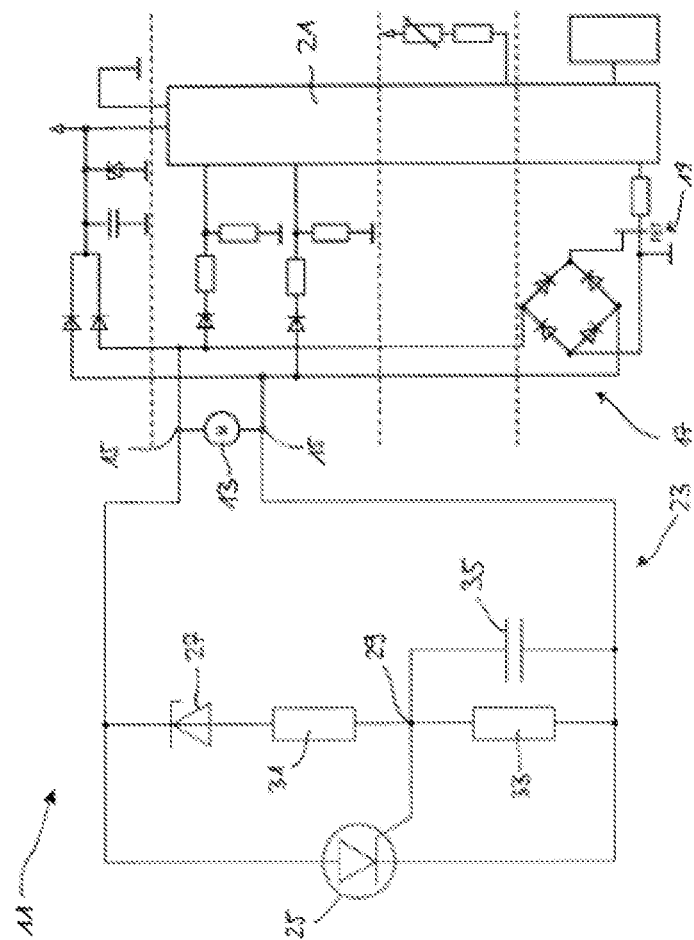

BRAKING MECHANISM

CROSS-REFERENCE TO RELATED APPLICATIONS

This application claims priority to German application 1020172019580.6, filed Feb. 8, 2017, which is hereby incorporated by reference in its entirety.

The present invention concerns a braking device for a movable door leaf.

Prior art discloses door closers for movable door leaves containing a mechanical energy storage facility and a braking device. When the door leaf is opened, the mechanical energy storage facility is charged with potential energy which closes the released door leaf again. The mechanical energy storage facility is for example connected to a spring which is tensioned by the opening of the door leaf. Subsequently, the potential energy in the spring closes the door leaf. The closing moment of the door leaf is determined by the current spring tension and the various transformation ratios in the system. The dosing speed itself is attenuated in the braking device, for example, through oil in a damper. The desired closing properties can be adjusted by various hydraulic valves and their settings. This enables a favourably-priced and autonomous implementation of the door closer, i.e. the door closer operates without the supply of external energy.

However, the closing speed of the door leaf with valves is only to a certain extent adjustable. So, for example, an end-impact function always has the same point of application, because only the flow but not the position of the valve is adjustable. Furthermore, functions that depend on the current speed of the door leaf can only be implemented in an elaborate way. Also, controlling of the dosing speed, for example at a desired closing time of the door leaf, is also difficult to implement. The valves can only be adjusted on a trial and error basis. The closing time changes in accordance with the temperature changes of the damper oil or the friction conditions in the door closer. In addition, if the door closer becomes leaky, leaking damper oil can lead to pollution of the environment and the damper oil must then be disposed of. Furthermore, as a general rule oil from the damper is flammable, which can contribute to the spreading of a fire if it leaks and ignites in the event of fire.

In order to avoid such disadvantages, the braking device can comprise an electric motor operated as a generator, whose motor shaft is rotatable through a movement of the door leaf and at whose motor terminals a movement-dependent motor voltage is created as well as a brake circuit to which the motor voltage is applied or could be applied and by way of which the motor terminals can be short-circuited to dampen movement of the door leaf. Damping does not take place because damper oil is forced through the valves, but because the electric motor operated as a generator, generates electrical energy that is used up by the short-circuiting. Such a braking device can also be provided in a non-electrically operated door closer, since no power source is required for operating the braking device. In this manner even a braking device equipped with an electric motor, which is generator-driven and which can be short-circuited, can enable an autonomous implementation of the door closer. Depending on the construction, the braking device, particularly the braking circuit mentioned, can also feature switching elements, which require a power supply in order to be actuated. Moreover, the braking device can be foreseen for inclusion in an electric door drive wherein the electric motor then, in addition to its function as generator of the braking device, can at the same time also serve as motor of the door drive requiring power supply.

A door drive for actuating a movable door leaf with such a braking device is known from DE 10 2005 028 007 B4. The braking circuit of this braking device has a switching element constructed as a field-effect transistor through which the motor terminals of the electric motor can be short-circuited. A drain-source path of the field-effect transistor is arranged in the brake circuit and an electric potential difference between the gate and source of the field-effect transistor is set via a potentiometer which is arranged in parallel with the drain-source path of the field-effect transistor. A voltage tap of the potentiometer is connected to the gate terminal of the field-effect transistor. In this manner, the field-effect transistor is operated as voltage-dependent load resistance for the electric motor, so that the braking force of the braking device depends on the output voltage of the electric motoroperated as a generator and which can also be set via the potentiometer.

A similar braking device is known from DE 10 2015 200 284 B3. This braking device has an evaluation and control unit which performs a pulse width modulation of the motor current via a switching element in the braking circuit and in this manner sets an effective braking force to dampen the movement of the door leaf. In this manner, the desired closing mode can be set very flexibly. This is due to the fact that the pulse width modulation of the motor current caused by the evaluation and control unit can be predetermined in many ways and in particular also depend on conditions detectable via sensors, for example, the current closing speed or the angular position of the door leaf, so that a regulation of the closing speed for achieving a desired closing mode also becomes possible.

However, in principle there is always the risk that once such a damping fails, i.e. the braking circuit is malfunctioning, this causes the desired damping to not be performed. As a result, the door leaf could move freely and undamped or hardly damped. Such a failure can occur for instance, when a component part is defective or during a line break. It is also possible that electromagnetic interferences impair the damping or cause a complete failure of the damping. A failure of the brake device, for example in a manually operated leaf swing door with door closers, could cause the door leaf to slam shut undamped after a manual opening. Such undamped slamming shut of a door not only causes noise pollution and increased wear and tear, but can also put a user of the door at risk.

The purpose of the invention is to provide a braking device which enables a reliable and safe as well as a preferably flexibly adjustable damping of a door leave and, in doing so, to provide improved security against failure.

The object is achieved by means of a braking device with the features of claim 1. Advantageous embodiments of the invention will become apparent from the subclaims, the current description as well as the drawings.

In addition to the brake circuit, the braking device according to the invention comprises an emergency brake circuit to which the motor voltage is applied or applicable and by way of which the motor terminals can be short-circuited to dampen a movement of the door leaf. In this instance, the emergency brake circuit is more specifically an additional electrical circuit which is separate from the brake circuit. Due to this precaution, an already favourable redundancy is provided with regard to the possibility to dampen a movement of the door leaf. This is due to the fact that the damping can now be fundamentally performed both ways, via the brake circuit and via the emergency brake circuit.

In addition, the braking device according to the invention is provided with means that are set to detect the presence of a malfunction of the brake circuit and to short-circuit the motor terminals via the emergency brake circuit when the presence of a malfunction of the brake circuit is detected. In other words, although the motor terminals can be short-circuited via both, the brake circuit and the emergency brake circuit, short-circuiting via the emergency brake circuit, in particular, is only triggered when there is a malfunction of the brake circuit.

This enables the braking device to operate under normal circumstances, essentially in accordance with conventional braking devices. Thus, under normal circumstances, that is to say when no failure and also no other malfunction of the brake circuit have been detected, the damping can be carried out in a conventional manner known per se solely via the brake circuit and particularly not via the emergency brake circuit. The presence of the emergency brake circuit then has no influence on the movement of the door leaf during normal operation. However, if there is a malfunction, so that the normal damping via the brake circuit fails completely or is at least significantly impaired, a short circuit can still take place via the emergency brake circuit, which advantageously is automatically triggered via the means already mentioned.

In accordance with a preferred embodiment, the means already mentioned are designed to continuously short circuit the motor terminals via the emergency brake circuit when a malfunction of the braking circuit occurs to dampen the movement of the door leaf, in particular until the door leaf comes to a standstill.

Short-circuiting preferably takes place via the emergency brake circuit so that the door leaf is as quickly as possible decelerated to a standstill. In this respect, the emergency brake circuit can subsequently differ substantially from the brake circuit. This is due to the fact that the brake circuit is advantageously designed in terms of a desired closing modus,—for example a desired closing time and/or a desired closing procedure, e.g. with an end impact or taking into account a desired closing sequence of several door leaves— and can more particularly be flexibly adjusted. On the other hand, it can be sufficient for the emergency brake circuit, which is preferably only activated if the braking circuit is malfunctioning, if it is able to cause a simple short circuit, essentially at least at a constant resistance. In order to reliably prevent the door leaf from striking shut even in the event of a failure of the braking circuit, the emergency braking circuit is advantageously designed to trigger comparatively strong damping, especially when a low-resistance short circuit occurs.

Such a clear difference in the damping of the door leaf depending on whether the damping takes place via the brake circuit or the emergency brake circuit has the extra advantage that the existence of a malfunction of the brake circuit can also be simply detected without separate indicator means via the changed damping of the door leaf. More specifically, if the door leaf is particularly strongly damped and/or comes to a standstill even before the closed position of the door, this can indicate that the emergency brake circuit is active and that the brake circuit has a malfunction. A user of the door leaf can then for example put a repair of the braking device in place.

In order to detect whether a malfunction of the brake circuit is present, various criteria are applicable. In accordance with an advantageous embodiment, the mentioned means are designed to detect the speed of the door leaf and to detect the presence of a malfunction of the brake circuit by means of the speed of the door leaf. This is due to the fact that for as long as the brake circuit fulfils its function, the movement of the door leaf is damped via the brake circuit, more specifically in such a way that the door leaf with active damping cannot achieve any high speeds via the brake circuit. If such high speed exists nevertheless, it can cause the malfunction of the braking circuit ton be detected and the emergency brake circuit to be activated.

More specifically, a maximum speed with which the detected speed of the door leaf may be compared, may be predetermined or predeterminable, wherein the maximum speed is then preferably so that it is not exceeded when the brake circuit is functional. If a speedabove the maximum speed is nevertheless detected, consequently, there is a malfunction of the brake circuit.

The speed of the door leaf can be detected for example by means of a sensor provided specifically for this purpose. However, such a sensor is not absolutely necessary. This is due to the fact that the speed can also be detected by means of the motor voltage emitted by the generator-driven electric motor. The braking device can then include means which, depending on the respective motor voltage, cause the motor terminals to short circuit via the emergency brake circuit.

It can be recognised in this example that the inventive detection of the presence of a malfunction of the brake circuit need not to be a separate step in reaction to a malfunction occurring in response to a short-circuit. Likewise, there is just as little need for the braking device to be designed in such a manner as to temporarily store the result of this detection in any way—namely whether or not there is a malfunction—or to signal it or to pass on such information. Instead, the mentioned detection may be limited to an indicator used for the presence of a malfunction of the brake circuit as a criterion for short-circuiting the motor terminals via the emergency brake circuit.

Alternatively, and preferably in addition to detecting the speed of the door leaf, provision can be made in accordance with a further advantageous embodiment, that the means mentioned are designed to detect via the amperage in the braking circuit both, the amperage in the braking circuit as well as the presence of a malfunctioning braking circuit. In other words, instead of or as an addition to the speed of the door leaf, the current in the braking circuit is used as criterion for short-circuiting the motor terminals via the emergency braking circuit. More specifically, if the brake circuit is designed to short circuit the motor terminals in a pulse-width-modulated current, the detected current may also be a time-averaged current.

In this way, a malfunctioning braking circuit may be detected earlier than would be case if only the speed of the door leaf would be taken into account. This is due to the fact that when the damping via the braking circuit is functioning, the motor terminals are short circuited via the braking circuit so that at a certain speed of the door leaf, which leads to a corresponding motor voltage at the motor terminals, a certain current intensity in the brake circuit is to be expected. This current which is to be expected in the braking circuit is therefore dependent on the respective speed of the door leaf. If the current deviates from current to be expected, especially if it falls below the current to be expected, this may clearly indicate a malfunction of the braking circuit. Such discrepancy between the speed of the door leaf and the current in the braking circuit can even occur and be detectable at low speeds. Consequently, the door leaf in this embodiment advantageously does not first have to exceed a maximum speed before the existence of a malfunction of the brake circuit and a short circuit via the emergency brake circuit can be triggered.

More specifically, a failure of the braking circuit is identifiable by virtue that the current in the braking circuit amounts to zero, although the door leaf has a speed which is different from zero in one of the movement directions to be damped by the braking device. This is due to the fact that no current is flowing in the braking circuit when the door is at standstill, because the electric motor that operates as generator at that point in time generates no voltage. And even if the door leaf does move in a movement direction to be dampened—e.g. if the braking device has been designed to only dampen the closing of the door leaf, and the door leaf is opened,—it is possible that no current is flowing in the braking circuit. However, if the door leaf is moving in a direction to be damped, it can be expected that, in order to dampen the movement by short-circuiting the motor terminals, current will flow through the brake circuit. If a current of zero is then nevertheless still recorded in the brake circuit, this may clearly indicate malfunction of the brake circuit.

In accordance with a preferred embodiment, the measures mentioned are integrated into the emergency brake circuit, so that the emergency brake circuit itself is designed to automatically short circuit the motor terminals due to the presence of a malfunction of the braking circuit. In other words, there is no need to provide any device differing from emergency brake circuit to detect whether there is a malfunction of the braking circuit and, if necessary, to trigger the emergency brake circuit to short-circuit the motor terminals. Instead, the emergency brake circuit itself may comprise one or more elements through which a short circuit of the motor terminals via the emergency brake circuit may be triggered by the presence of a malfunction of the braking circuit. For this purpose, such an element of the emergency braking circuit can be fundamentally cross-connected to the braking circuit to measure the current in the braking circuit if necessary and to switch the emergency braking circuit as a function of the respective amperage. However, even if there is such a cross connection, the braking circuit and the emergency brake circuit are preferably designed to be separate circuits, so that in particular a short circuit occurring via the braking circuit of the motor terminals does not also take place via the emergency brake circuit and vice versa.

In accordance with an advantageous embodiment, the emergency braking circuit is designed in the manner of a clamping circuit for voltage surge protection. Such a clamping circuit, which is also referred to as crowbar, may serve in the context of voltage surge protection when a certain voltage is exceeded to discharge current and, for example, to guide through a fuse so that it activates and interrupts the power supply. This basic principle can also be used for the emergency brake circuit. Insofar, the emergency brake circuit is designed as a whole, to detect the presence of a malfunction of the brake circuit, namely by means of the motor voltage applied to the emergency brake circuit, and, in response to the existence of a malfunction to short circuit the motor terminals. Since in doing so, the presence of a malfunction of the brake circuit is detected by means of the motor voltage, in case of such an embodiment it is not necessary that the emergency brake circuit be cross-connected to the braking circuit to detect in this way whether a malfunction is present in the braking circuit.

More specifically, when the emergency brake circuit is designed without such a cross connection to the braking circuit, it can simply be connected in parallel to the braking circuit at the motor terminals. This advantageously neither requires a modification of the braking circuit, nor does it impair its function. This also makes it easier to retrofit an emergency brake circuit to provide improved safety to a braking device. If the braking circuit then fails and the motor voltage increases excessively as a result, the emergency brake circuit automatically shuts down, so to speak, and short circuits the motor terminals so that, despite the failure of the braking circuit, at least a simple but effective damping can still take place via the emergency brake circuit.

In accordance with a preferred development, the emergency brake circuit comprises a thyristor through which the motor terminals can be short-circuited. In the context of a clamping circuit, a thyristor is particularly well-suited as a switching element, particularly for a short-circuiting of motor terminals which depend in particular on the motor voltage and also on current . . . . This is particularly due to the fact that a thyristor remains conductive once it has been ignited, i.e. switched in a conductive manner, as long as a significant current still flows through the thyristor, even if no current continues to flow at the gate. In this manner, the short circuit can be upheld, even if the voltage triggering the short circuit or the current triggering the short circuit, e.g. due to the short circuit and the damping resulting thereof, collapses or at least decreases. Thus, by means of an emergency brake circuit with thyristor, a continuously strong damping of the door leaf, specifically up to its standstill can be particularly achieved.

Preferably, such an emergency brake circuit further contains a Zener diode, which is arranged in a branch of the emergency brake circuit, parallel to the anode-cathode path of the thyristor, wherein the parallel branch is cross-connected to the gate of the thyristor. In the process, the Zener diode is preferably arranged between the anode and the gate of the thyristor with a forward direction which is anti-parallel to the thyristor. In such an arrangement, the Zener diode can be used to set the voltage at which the thyristor ignites. Via a variable or exchangeable Zener diode the emergency brake circuit can therefore also be adjusted at various sensitivity levels.

Furthermore, it is preferred that at least one resistor is to be arranged in series with the Zener diode in the parallel branch. This enables the achievement of a defined voltage drop between the Zener diode and the resistor. In accordance with an advantageous further development, a capacitor is also arranged in parallel with the resistance. As a consequence, voltage spikes can be filtered out via the capacitor, which are not necessarily based on an actual malfunction of the braking circuit, but can be generated by disturbances. The filtering prevents in this case that such voltage peaks lead to a firing of the thyristor.

In accordance with another advantageous embodiment of an emergency brake circuit with thyristor as well as a branch with Zener diode parallel to the thyristor, it is envisaged that in the parallel branch, in particular between the Zener diode and a resistor arranged in series with the Zener diode, a voltage tap is provided which is connected to the gate of the thyristor. The thyristor can then be fired via this connection between the parallel branch and the gate of the thyristor. Because, when the voltage applied to the Zener diode voltage exceeds the breakdown voltage of the Zener diode, current can flow through the Zener diode and via the cross connection from the voltage tap to the gate of the thyristor, so that the thyristor is fired and consequently, a direct current flow occurs through the thyristor, namely along its anode-cathode path, which can then lead to an advantageously low-resistance short circuit of the motor terminals via the thyristor.

In the process, a further resistor is preferably arranged between the Zener diode and the voltage tap and/or between the voltage tap and the gate of the thyristor. By means of further resistors, the voltage distribution in the parallel branch and/or the current flowing through the parallel branch to the gate of the thyristor can be set in order to achieve a desired triggering and damping characteristic of the emergency brake circuit.

Furthermore, it can be advantageous in an emergency brake circuit with thyristor, if the emergency brake circuit comprises a diode which is arranged in such a manner that it blocks a short-circuiting of the motor terminals when a polarized motor voltage is applied to the emergency brake circuit against the forward direction of the thyristor. Such an embodiment is particularly useful when a branch parallel to the thyristor is foreseen through which current could otherwise flow unimpeded. When in such a parallel branch, a Zener diode is arranged, it blocks a current that is applied against its forward direction of flow until its breakdown voltage is reached. However, it is always conductive in the forward direction. Since the Zener diode is advantageously arranged anti-parallel to the thyristor, that is to say with opposite transmission directions, it would thus not block a current through the parallel branch, which is caused by a motor voltage which is polarized counter to the forward direction of the thyristor. In the case of reverse polarity of the motor voltage, a short circuit via the parallel branch can take place. In order to prevent the door leaf from being damped by such a short circuit via the emergency brake circuit taking place in a direction of movement, which actually should be undamped, the mentioned diode can be provided.

The term diode in this context is to be understood in particular functionally and thus generally comprises components or also arrangements of components which permit a current flow in a forward direction and block it counter to the forward direction.

BRIEF DESCRIPTION OF THE DRAWINGS

The FIGURE is a circuit diagram of an embodiment of the braking device described herein.

The invention is explained in greater detail below by way of example only with reference to the FIGURE.

The FIGURE shows a braking device 11 for a door leaf which is not illustrated, wherein the braking device 11 can be designed in particular as part of a door closer or a door drive for the door leaf. In the FIGURE the braking device 11 is shown schematically in the form of a schematic.

The braking device 11 comprises an electric motor 13 with a motor shaft which is operatively coupled to the door leaf, so that a movement of the door leaf leads to a rotation of the motor shaft. Conversely, a rotation of the motor shaft can lead to a movement of the door leaf, so that the electric motor 13 can be used as a motor of a door drive. An essential feature of the electric motor 13, however, is that it can be operated as a generator. If the door leaf is not driven by the electric motor 13, but is nevertheless moved, and consequently also rotates the motor shaft, a motor voltage is generated at the motor terminals 15 of the electric motor 13.

The brake device 11 comprises a brake circuit 17, which is connected via the motor terminals 15 to the electric motor 13, so that the respective motor voltage is applied to the brake circuit 17. The brake circuit 17 is designed in the exemplary embodiment shown in the FIGURE as described in DE 10 2015 200 284 B3. More specifically, the braking circuit 17 comprises a switching element 19 in the form of a Field Effect Transistor (FET) which is switchable by means of a control unit 21, for example pulse-width modulated. Depending on the switching state of the switching element 19, the motor terminals 15 are short circuited via the brake circuit 17, in particular via the switching element 19 in the brake circuit 17.

Due to such a short circuit of the motor terminals 15, a load is applied to the electric motor 13 by which the rotation of the motor shaft and thus the movement of the door leaf is halted. Subsequently, the brake circuit 17 leads to a damping of the movement of the door leaf. More specifically, by means of variable pulse-width modulation of the switching state of the switching element 19, the respective damping can be specifically adapted or be adaptable to the respective requirements.

In the braking device 11 in accordance with the invention, parallel to the braking circuit 17, an additional emergency brake circuit 23, which is designed separately to the braking circuit 17, is provided, which, in the same way as braking circuit 17, is connected via the motor terminals 15 to the electric motor 13. Subsequently, the respective motor voltage generated by the electric motor 13 is also connected to the emergency brake circuit 23.

Usually, i.e. when there is no malfunction of the braking circuit 17, the emergency braking circuit 23 is disabled, so that the motor terminals 15 are then not short-circuited via the emergency braking circuit 23. In this respect, the function of the braking circuit 17 via the emergency braking circuit 23 is not affected.

The blockage of a current flow through the emergency brake circuit 23 is conditional, due to the fact that each of both parallel branches of the emergency brake circuit 23 contains a blocking element. In the one branch a thyristor 25 is arranged, which even though it is aligned in forward direction with respect to the polarity of the motor voltage during a movement of the door leaf in the movement direction fundamentally to be dampened, is, however, only switched on in a conducting manner, that is to say is fired, due to the fact that a current flows at the gate of the thyristor 25, which is not the case during normal operation. A Zener diode 27 arranged in blocking direction in the parallel branch which, as a consequence, blocks a current flow in this branch during normal operation.

However, if the motor voltage rises above the breakdown voltage of the Zener diode 27, the latter is also conductive in the reverse direction. Consequently, via the connection of the voltage tap 29 with the gate of the thyristor 25 voltage is applied between the gate and the cathode of the thyristor 25 so that a current flows at the gate of the thyristor 25. Consequently, the thyristor 25 fires and thus the entire branch of the emergency brake circuit 23 containing the thyristor 25 becomes conductive in a low-ohmic manner, whereby the motor terminals 15 are short-circuited via the emergency brake circuit 23.

In the branch of the emergency brake circuit 23, which contains the Zener diode 27, two resistors 31, 33 are arranged in series with the Zener diode 27, between which the voltage tap 29 is located. In addition, a capacitor 35 is provided parallel to the resistor 33 further away from the Zener diode 27. Through this arrangement of the capacitor 35, a passive low-pass filter is created from which short-time voltage pulses can be filtered out. As a consequence, it can advantageously be ensured that individual voltage peaks, which are not actually caused by a malfunction of the emergency brake circuit 17, but rather, randomly or by way of temporary effects, do not lead to a triggering of a short circuit via the emergency braking circuit 23. In one embodiment, a further resistor 36 is arranged between the Zener diode 27 and the voltage tap 29 and/or between the voltage tap 29 and the gate of the thyristor 25.

The Zener diode 27 and the two resistors 31, 33 are designed in such a way that the thyristor 25 only fires when the motor voltage reaches and/or exceeds a maximum voltage. This maximum voltage corresponds to a speed of the door leaf, which is so high that it would not be reached when the brake circuit 17 is functioning. Exceeding the maximum voltage can therefore be regarded as an indication for a failure of the damping of the brake circuit 17, whereupon the thyristor 25 is automatically fired as a direct cause of the high motor voltage. In this respect, the emergency brake circuit 23 is designed to automatically short circuit at the detection of the presence of a malfunction of the braking circuit 17 and of the motor terminals 15 when a malfunction of the braking circuit 17 occurs.

The direct short-circuit via the thyristor 25, which is also maintained at decreasing motor voltage, then causes a strong damping of the movement of the door leaf. More specifically, this damping via the emergency brake circuit 23 is much stronger than a damping triggered by the functioning brake circuit 17, at which the short circuit is advantageously designed with pulse width modulation and to cause a desired closing modus of the door leaf. Damping via the emergency brake circuit 23 may be so strong, for example, that the closing door leaf is halted to a stop even before it is fully closed. However, at least the closing time for a damping of the door leaf via the emergency brake circuit 23 in comparison to the closing time for a damping via the brake circuit 17 may be considerably extended.

From the changed closing mode of the door leaf the user can then recognize that the damping no longer takes place via the braking circuit 17 but via the emergency braking circuit 23 and that there is consequently a malfunction of the braking circuit 17. The user can then announce that a repair of the braking device 11 is due. Until this repair has taken place, the door leaf will not simply slam close in an undamped way, but due to the design of the brake device 11 in accordance with the invention, it is damped via the emergency brake circuit 23 as an alternative. As a consequence, the reliability and safety of the braking device 11 has been improved without impairing the benefits of damping via the brake circuit 17 in normal operation.

REFERENCE NUMBERS

11 Braking device
13 Electric motor
15 Motor terminals
17 Braking circuit
19 Switching element
21 Control unit
23 Emergency braking circuit
25 Thyristor
27 Zener diode
29 Voltage tap
31 Resistance
33 Resistance
35 Capacitor

The invention claimed is:

1. A braking device (11) for a movable door leaf comprising:
an electric motor (13) driven as a generator, the electric motor including a motor shaft configured to generate a motion-dependent motor voltage by a movement of the door leaf at motor terminals (15), the electric motor comprising a braking circuit (17), to which the motor voltage is applied and over which the motor terminals (15) are short-circuited to dampen movement of the door leaf,
wherein the braking device (11) comprises:
an emergency brake circuit (23) to which the motor voltage is applied and which can be short circuited via the motor terminals (15) to dampen movement of the door leaf; and
means configured to detect a presence of a malfunction of the braking circuit (17) and to short circuit the motor terminals (15) via the emergency brake circuit (23) when there is a malfunction of the braking circuit (17), and
wherein the emergency brake circuit (23) comprises:
a thyristor (25) through which the motor terminals (15) can be short circuited;
a Zener diode (27) arranged in a parallel branch of the emergency brake circuit (23) facing an anode-cathode path of the thyristor (25), the parallel branch cross-connected to a gate of the thyristor (25);
in the parallel branch, a resistor (31, 33) arranged in series with the Zener diode (27); and
a capacitor (35) arranged in parallel with the resistor (33).

2. The braking device according to claim 1 wherein the means are configured to continuously short circuit the motor terminals (15) during an occurrence of a malfunction of the braking circuit (17) via the emergency brake circuit (23) to consistently dampen the movement of the door leaf until the door leaf comes to a standstill.

3. The braking device according to claim 1 wherein the means are configured to detect a speed of the door leaf and to detect the presence of a malfunction of the braking circuit (17) on a basis of the speed of the door leaf exceeding a maximum speed.

4. The braking device according to claim 1 wherein the means are configured to detect an amperage in the braking circuit (17) and the presence of a malfunction of the braking circuit (17) on the basis of a current intensity in the braking circuit (17) not achieving an amperage to be expected.

5. The braking device according to claim 1 wherein the means are integrated into the emergency brake circuit (23) so that the emergency brake circuit (23) is configured to automatically short circuit the motor terminals (15) following an occurrence of a malfunction of the braking circuit (17).

6. The braking device according to claim 1 wherein the emergency brake circuit (23) comprises a clamp circuit for voltage surge.

7. A braking device for a movable door leaf comprising:
an electric motor (13) driven as a generator, the electric motor including a motor shaft configured to generate a motion-dependent motor voltage by a movement of the door leaf at motor terminals (15), the electric motor comprising a braking circuit (17), to which the motor voltage is applied and over which the motor terminals (15) are short-circuited to dampen movement of the door leaf,
wherein the braking device (11) comprises:
an emergency brake circuit (23) to which the motor voltage is applied and which can be short circuited via the motor terminals (15) to dampen movement of the door leaf; and
means configured to detect a presence of a malfunction of the braking circuit (17) and to short circuit the motor terminals (15) via the emergency brake circuit (23) when there is a malfunction of the braking circuit (17); and wherein the emergency brake circuit (23) comprises:

a thyristor (25) through which the motor terminals (15) can be short circuited;

a Zener diode (27) arranged in a parallel branch of the emergency brake circuit (23) facing an anode-cathode path of the thyristor (25), the parallel branch cross-connected to a gate of the thyristor (25);

a voltage tap (29) in the parallel branch between the Zener diode (27) and a resistor (33) in series with the Zener diode (27), the voltage tap (29) connected to the gate of the thyristor (25); and a further resistor arranged between the Zener diode (27) and the voltage tap (29) and/or between the voltage tap (29) and the gate of the thyristor (25).

8. The braking device according to claim 7 wherein the means are configured to continuously short circuit the motor terminals (15) during an occurrence of a malfunction of the braking circuit (17) via the emergency brake circuit (23) to consistently dampen the movement of the door leaf until the door leaf comes to a standstill.

9. The braking device according to claim 7 wherein the means are configured to detect a speed of the door leaf and to detect the presence of a malfunction of the braking circuit (17) on a basis of the speed of the door leaf exceeding a maximum speed.

10. The braking device according to claim 7 wherein the means are configured to detect an amperage in the braking circuit (17) and the presence of a malfunction of the braking circuit (17) on the basis of a current intensity in the braking circuit (17) not achieving an amperage to be expected.

11. The braking device according to claim 7 wherein the means are integrated into the emergency brake circuit (23) so that the emergency brake circuit (23) is configured to automatically short circuit the motor terminals (15) following an occurrence of a malfunction of the braking circuit (17).

12. The braking device according to claim 7 wherein the emergency brake circuit (23) comprises a clamp circuit for voltage surge.

13. A braking device for a movable door leaf comprising:

an electric motor (13) driven as a generator, the electric motor including a motor shaft configured to generate a motion-dependent motor voltage by a movement of the door leaf at motor terminals (15), the electric motor comprising a braking circuit (17), to which the motor voltage is applied and over which the motor terminals (15) are short-circuited to dampen movement of the door leaf, wherein the braking device (11) comprises:

an emergency brake circuit (23) to which the motor voltage is applied and which can be short circuited via the motor terminals (15) to dampen movement of the door leaf; and means configured to detect a presence of a malfunction of the braking circuit (17) and to short circuit the motor terminals (15) via the emergency brake circuit (23) when there is a malfunction of the braking circuit (17); and wherein the emergency brake circuit (23) comprises:

a thyristor (25) through which the motor terminals (15) can be short circuited; and a diode arranged to block a short circuiting of the motor terminals (15) when a polarized motor voltage is applied to the emergency brake circuit (23) against a forward direction of the thyristor (25).

14. The braking device according to claim 13 wherein the means are configured to continuously short circuit the motor terminals (15) during an occurrence of a malfunction of the braking circuit (17) via the emergency brake circuit (23) to consistently dampen the movement of the door leaf until the door leaf comes to a standstill.

15. The braking device according to claim 13 wherein the means are configured to detect a speed of the door leaf and to detect the presence of a malfunction of the braking circuit (17) on a basis of the speed of the door leaf exceeding a maximum speed.

16. The braking device according to claim 13 wherein the means are configured to detect an amperage in the braking circuit (17) and the presence of a malfunction of the braking circuit (17) on the basis of a current intensity in the braking circuit (17) not achieving an amperage to be expected.

17. The braking device according to claim 13 wherein the means are integrated into the emergency brake circuit (23) so that the emergency brake circuit (23) is configured to automatically short circuit the motor terminals (15) following an occurrence of a malfunction of the braking circuit (17).

18. The braking device according to claim 13 wherein the emergency brake circuit (23) comprises a clamp circuit for voltage surge.

* * * * *